US012394087B2

United States Patent
Planche et al.

(10) Patent No.: US 12,394,087 B2
(45) Date of Patent: Aug. 19, 2025

(54) SYSTEMS AND METHODS FOR DETERMINING 3D HUMAN POSE BASED ON 2D KEYPOINTS

(71) Applicant: Shanghai United Imaging Intelligence Co., Ltd., Shanghai (CN)

(72) Inventors: Benjamin Planche, Briarwood, NY (US); Ziyan Wu, Lexington, MA (US); Meng Zheng, Cambridge, MA (US); Abhishek Sharma, Boston, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 494 days.

(21) Appl. No.: 17/897,465

(22) Filed: Aug. 29, 2022

(65) Prior Publication Data
US 2024/0070905 A1    Feb. 29, 2024

(51) Int. Cl.
*G06T 7/73* (2017.01)

(52) U.S. Cl.
CPC ...... *G06T 7/74* (2017.01); *G06T 2207/30196* (2013.01)

(58) Field of Classification Search
CPC ... G06T 7/74; G06T 2207/30196; G06T 7/75; G06V 40/20; G06V 10/462
See application file for complete search history.

(56) References Cited

U.S. PATENT DOCUMENTS

| 8,160,334 B2 | 4/2012 | Thiel et al. |
| 2022/0415076 A1* | 12/2022 | Chen ............... G06V 10/803 |
| 2023/0298204 A1* | 9/2023 | Wang ............... G06T 19/20 |
| | | 345/419 |

FOREIGN PATENT DOCUMENTS

| CN | 107004275 A | 8/2017 |
| CN | 111738220 A | 10/2020 |
| KR | 20080105698 A | 12/2008 |
| WO | 2021051526 A1 | 3/2021 |

* cited by examiner

Primary Examiner — Christopher Wait
(74) Attorney, Agent, or Firm — Zhong Law, LLC

(57) ABSTRACT

The 3D pose of a person may be estimated by triangulating 2D representations of body keypoints (e.g., joint locations) of the person. The triangulation may leverage various metrics such as confidence scores associated with the 2D representations of a keypoint and/or temporal consistency between multiple 3D representations of the keypoint. The 2D representations may be arranged into groups, a candidate 3D representation may be determined for each group, taking into account of the confidence score of each 2D representation in the group, and the candidate 3D representation that has the smallest error may be used to represent the keypoint. Other 3D representation(s) of the keypoint determined from images taken at different times may be used to refine the 3D representation of the keypoint.

16 Claims, 5 Drawing Sheets

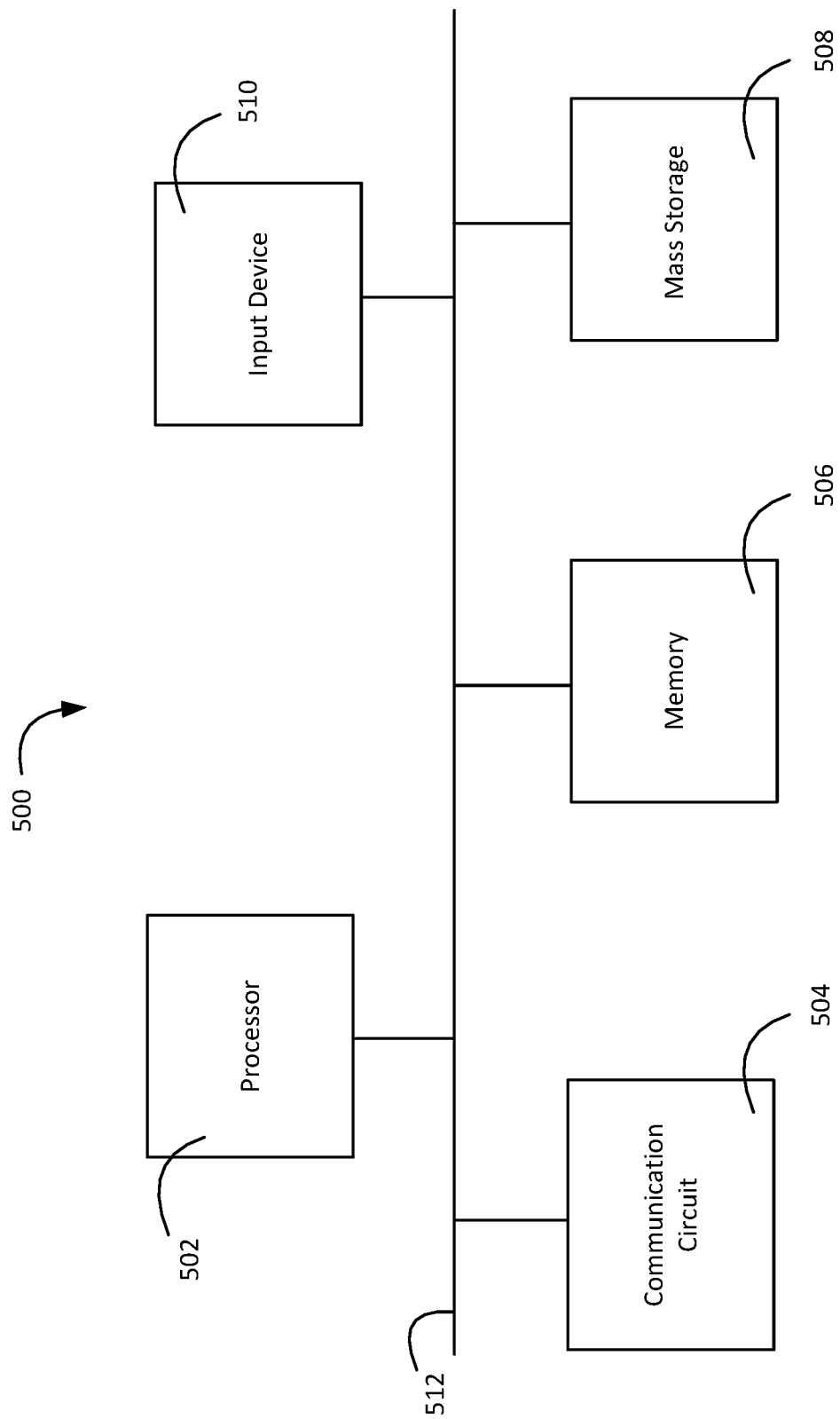

SYSTEMS AND METHODS FOR DETERMINING 3D HUMAN POSE BASED ON 2D KEYPOINTS

BACKGROUND

Three-dimensional (3D) human pose estimation is one of the fundamental problems in computer vision, with applications in sports, action recognition, computer-assisted living, human-computer interfaces, virtual reality (e.g., telepresence), robotics, and healthcare. Because of this wide range of applications, 3D human pose estimation (e.g., from two-dimensional (2D) images) has gained much attention. Many challenges remain, however, since reconstructing a 3D human pose from 2D images is an ill-posed problem where many hypotheses may exist for a specific input (e.g., due to depth ambiguities, occlusions, etc.).

SUMMARY

Described herein are systems, methods, and instrumentalities for inferring the 3D pose of a person based on images (e.g., 2D images) of the person. Using the techniques described herein, an example apparatus may be able to reconstruct 3D human pose (e.g., including 3D human position) from a set of images (e.g., noisy, multi-view 2D images) using triangulation methods and leveraging various metrics such as confidence scores or temporal consistency to weight the contributions of the input images to the 3D pose estimation. Such an example apparatus may comprise one or more processors configured to obtain a first set of images of a person (e.g., a patient on a surgery table or in front a medical scanner), where each of the first set of images may be captured by a respective image sensor (e.g., a camera). The one or more processors may be further configured to determine respective two-dimensional (2D) representations of a keypoint (e.g., a joint location) of the person based on the first set of images. Each of these 2D representations may be associated with a confidence score that may indicate an accuracy of the 2D representation, which can be determined by a detection device, a human annotator, or an independent entity (e.g., another device or person). Based on all or a subset of the 2D representations, the one or more processors may be further configured to determine a first 3D representation of the keypoint based on a triangulation of the 2D representations and, in doing so, may take the confidence score associated with each 2D representation into consideration. The one or more processors may then estimate the 3D pose of the person based on at least the 3D representation of the keypoint (e.g., based on multiple keypoints or joint locations of the person).

In examples, the one or more processors may be configured to arrange the 2D representations of the keypoint into multiple groups, each of which may include two or more of the 2D representations. For each of these groups, the one or more processors may be further configured to predict a respective candidate 3D representation of the keypoint by triangulating the two or more 2D representations of the keypoint included in the group, and determine a respective error associated with the prediction of the candidate 3D representation. The one or more processors may be further configured to select the candidate 3D representation that has the smallest error as the first 3D representation of the keypoint described above.

In the above examples, the respective error associated with the prediction of the candidate 3D representation for each of the multiple groups may be determined by obtaining 2D re-projections of the candidate 3D representation in respective coordinate systems of the two or more 2D representations of the group, and calculating a sum of differences between the 2D re-projections and the two or more 2D representations. The sum of the differences may be calculated by determining a respective difference between each of the 2D re-projections and a corresponding 2D representation, weighting the difference by the confidence score associated with the corresponding 2D representation, and calculating a total of the weighted differences. The 2D re-projections may be determined based on respective projection matrices of the cameras (or other suitable image sensors) associated with the 2D re-projections, and the respective difference between each of the 2D re-projections and the corresponding 2D representation may be determined as a mean Euclidean distance between the 2D re-projection and the corresponding 2D representation.

In examples, the one or more processors of the example apparatus described above may be further configured to obtain a second 3D representation of the keypoint of the person based on a second set of images of the person captured at an earlier time (e.g., earlier than the first set of images), and to refine the first 3D representation based on the second 3D representation (e.g., to ensure consistency across times). In examples, the one or more processors may be configured to determine a time span between when the second set of images was captured and when the first set of images was captured, and to refine the first 3D representation with the second 3D representation based on the time span. For instance, the one or more processors may be configured to apply a weight to the second 3D representation during the refinement of the first 3D representation, wherein the weight may be inversely proportional to the time span (e.g., the greater the time span, the lesser the weight). The weight may be set to zero, for example, if the time span exceeds a threshold value or if a difference between the first 3D representation and the second 3D representation exceeds a threshold value (e.g., the second representation may be discarded in those situations). In examples, if the person has moved between the time the second set of images was captured and the time the first set of images was captured, the one or more processors may be configured to adjust the second 3D representation of the keypoint based on the movement of the person before using the second 3D representation to refine the first 3D representation.

BRIEF DESCRIPTION OF THE DRAWINGS

A more detailed understanding of the examples disclosed herein may be had from the following description, given by way of example in conjunction with the accompanying drawing.

FIG. 5 is a simplified block diagram illustrating example components of an apparatus that may be configured to perform the tasks described herein.

DETAILED DESCRIPTION

The present disclosure is illustrated by way of example, and not by way of limitation, in the figures of the accompanying drawings.

Figure 1:
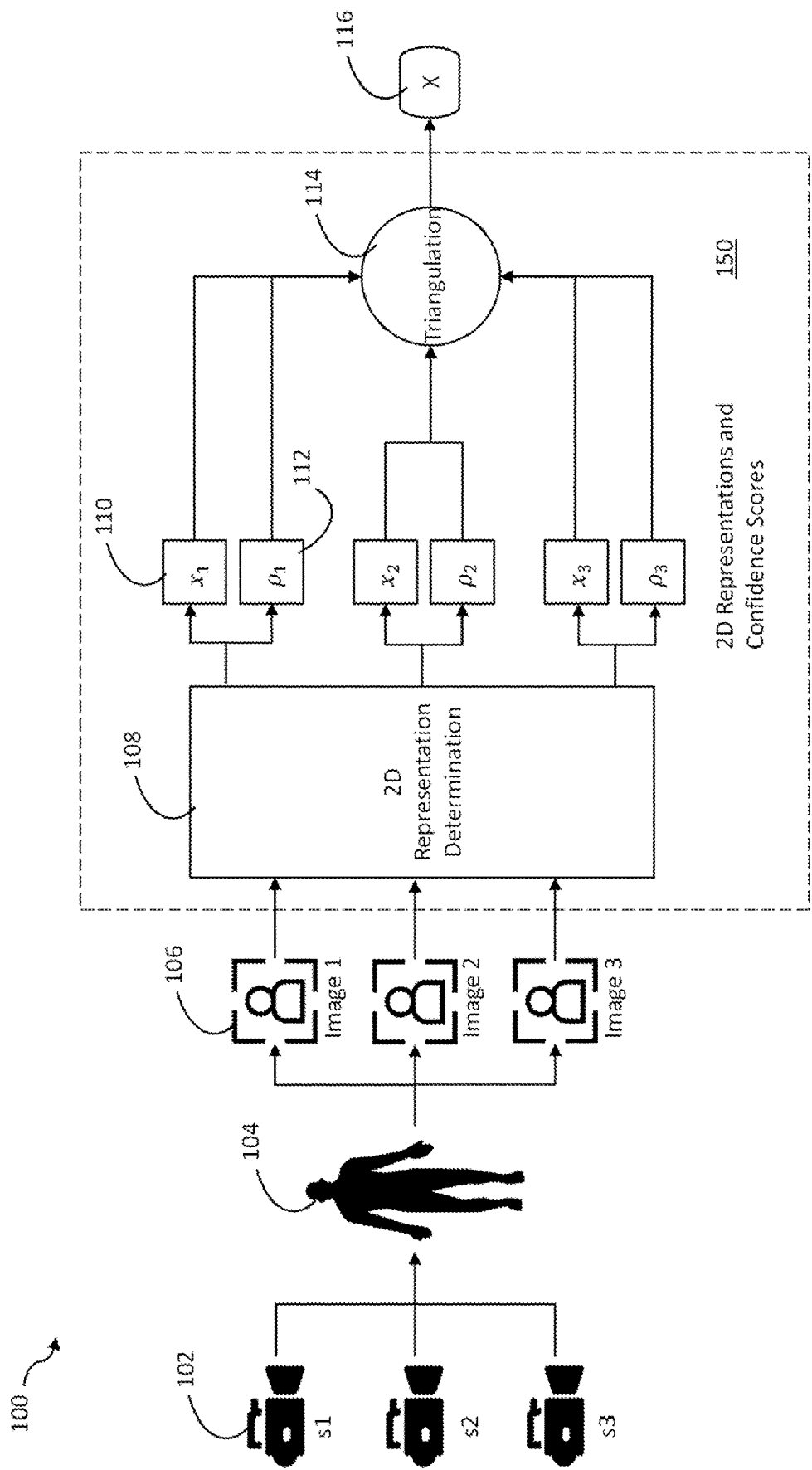
FIG. 1 is a simplified block diagram illustrating an example of 3D human pose reconstruction as described herein.

FIG. 1 illustrates an example of 3D human pose estimation in accordance with one or more embodiments of the disclosure provided herein. As shown, an example system 100 may be configured to capture multi-view images (or any other type of information) of a person (e.g., a patient under surgery or in another medical environment), and infer the 3D pose of the person based on the multi-view images (e.g., even if the images include noise or occlusions that may interfere with the estimation of the 3D pose). The 3D pose of the person may be defined by the respective 3D positions of a plurality body keypoints of the person and, as such, the 3D pose of the person may be estimated by determining 3D representations of the keypoints that may correspond to key human pose landmarks (e.g., joint locations) of the person.

In examples, the system 100 may comprise a plurality of (e.g., two or more) image sensors 102, which are denoted in FIG. 1 as S, for an example setup with 3 sensors, S={1,2,3}. The image sensors 102 may include cameras (e.g., digital color cameras, etc.), red, green, and blue (RGB) sensors, depth sensors, RGB plus depth (RGB-D) sensors, thermal sensors such as infrared (FIR) or near-infrared (NIR) sensors, and/or other types of image-capturing circuitry configured to generate images (e.g., 2D images or photos) of a person, object or scene. The image sensors 102 may be placed at different locations of a medical environment (e.g., at different places in a surgical room), and each of the image sensors may be configured to acquire a respective sequence of images 106 of a person 104 from a respective viewpoint. Depending on the type of image sensors or image capturing circuits used, the images 106 generated by the image sensors 102 may include, for example, one or more photos of the person 104 taken by a camera, one or more thermal images of the person 104 generated by a thermal sensor, and/or the like.

In examples, the system 100 may comprise an apparatus 150 (e.g., a computing device) configured to determine, based on each image 106 captured by an image sensor $s_i$, a 2D pose representation 110 (referred to herein as $x_i$, where i∈S) of the person 104. Such a 2D pose representation may include respective 2D representations of the plurality of body keypoints of the person, which may, in some examples, be estimated using a 2D keypoint detection technique 108 or, in other examples, be derived based on manual annotation. The accuracy of the 2D pose representation 110 ($x_i$) compared to the ideal 2D representation may vary among the set of image sensors 102, for example, since different factors associated with the sensors 102 (e.g., inherent inexactness of the chosen technique, lack of visual information, sensor noise, etc.) may introduce different errors into the estimation. To account for the varying accuracy of the 2D pose representation 110 ($x_i$) in the estimation of the 3D pose of the person, a confidence score 112 (referred to herein as $\rho_i$, where i∈S) may be determined for (e.g., assigned to) each 2D representation 110 ($x_i$) and used to indicate the confidence in or the accuracy of each 2D pose estimation 110 ($x_i$). The confidence score 112 (e.g., which may comprise a numeric value between 0-1) may be determined as part of the 2D representation determination 108, by a separate component of the apparatus 150, or by a human annotator, and the determination may be based on, for example, the location and/or viewpoint of the corresponding image sensor $s_i$, the image quality produced by the image sensors $s_i$, objects between the image sensor $s_i$ and the person 104 (which may cause blocking of the person from the view of the image sensor), and/or other factors or conditions associated with the image sensor $s_i$, the environment in which the image sensor is installed, the apparatus 150, or the human annotator.

In examples, the confidence score 112 described herein may be determined using a neural network trained to take as input intermediary features extracted by a 2D keypoint detection network, and use these features to predict the confidence score of a 2D keypoint detection (e.g., the neural network may be trained to link "fuzzy" intermediary features to a lower confidence score). In examples, the confidence score 112 may be determined based on the type of algorithm employed the 2D keypoint detection network (e.g., a more powerful detection algorithm may be linked to a higher confidence score), and/or based on the training regimen of the 2D keypoint detection network (e.g., a detection network trained on larger or more relevant datasets may be given a higher confidence score). In examples, the confidence score 112 may be determined by an annotator or evaluator (e.g., some evaluators may be stricter than others, returning different confidence scores for the same prediction). The annotator may be, for example, an apparatus or a human.

In examples, apparatus 150 of the system 100 may be configured to employ triangulation techniques 114 to determine respective 3D representations of the person's body keypoints and further estimate the 3D pose 116 (also referred to herein as X) of the person based on the 3D representations of the body keypoints. For instance, the 3D representation of each keypoint may be determined by triangulating (e.g., based on singular value decomposition or SVD) all or a subset of the 2D representations of the keypoint and by taking into consideration the confidence score associated with each of the 2D representations during the triangulation. In examples, the confidence score associated with each of the 2D representations may be factored into the calculation of an error associated with the triangulation. For instance, while determining the 3D representation of a keypoint, the 2D representations of that keypoint (e.g., estimated based on the images 106 captured by the image sensors 102) may be arranged into multiple groups, where each group may include two or more of the 2D representations (e.g., each group may be associated with two or more of the image sensors 102). For the multiple groups, a respective candidate 3D representation of the keypoint may be predicted for each group by triangulating the two or more 2D representations of the keypoint included in the group, determining an error associated with each candidate 3D representation, and selecting the candidate 3D representation that has the smallest error as the 3D representation of the keypoint. The prediction error associated with the candidate 3D representation of a group may be determined by re-projecting the candidate 3D representation into the respective coordinate systems of the 2D representations of the group, and calculating a sum of differences between the 2D re-projections and the corresponding 2D representations. The sum of differences may be calculated by determining the difference between each of the 2D re-projections and the corresponding 2D representation, and weighting the difference by the confidence score associated with the corresponding 2D representation before a total of the weighted differences is calculated. This way, a 2D representation having a higher confidence score may be given more weight in the estimation of the 3D representation, thus increasing the accuracy of the 3D estimation (e.g., the 3D representation selected using the techniques described herein may be the one whose re-projections are closest to the 2D representations having a high confidence score, in order to minimize the sum of losses).

In examples, apparatus 150 of the system 100 may be configured to take temporal consistency (e.g., consistency across time) into consideration when estimating the 3D representation of a keypoint. For example, in addition to determining a first 3D representation of the keypoint based on first set of images taken at a first time, the apparatus 150 may also determine a second 3D representation of the keypoint based on a second set of images that may be captured at a second time (e.g., earlier than the first set of images). The apparatus 150 may then refine the first 3D representation based on the second 3D representation, e.g., based on a weighted average of the first 3D representation and the second 3D representation. The respective weights assigned to the first and second representations may be determined based on the estimated accuracies of (e.g., as indicated by re-projection errors) or confidence in the two representations. For instance, the apparatus 150 may be configured to determine a time span between the first time and the second time, and to refine the first 3D representation with the second 3D representation based on the time span. The apparatus 150 may, for example, apply a weight to the second 3D representation during the refinement of the first 3D representation, where the weight may be inversely proportional to the time span (e.g., the greater the time span, the less weight may be given to the second 3D representation). The weight may be set to zero, for example, if the time span exceeds a threshold value or if a difference between the first 3D representation and the second 3D representation exceeds a threshold value (e.g., a zero weight may have the effect of discarding the second representation). In examples, the apparatus 150 may determine (e.g., based on its own estimation or information obtained from another source) that the person may have moved between the first time and the second time, for example, because a surgery table that the person is lying on was moved from one predefined position to another. The apparatus 150 may, in this situation, adjust (e.g., transform) the second 3D representation based on the movement of the person before using the second 3D representation to refine the first 3D representation.

Figure 2:
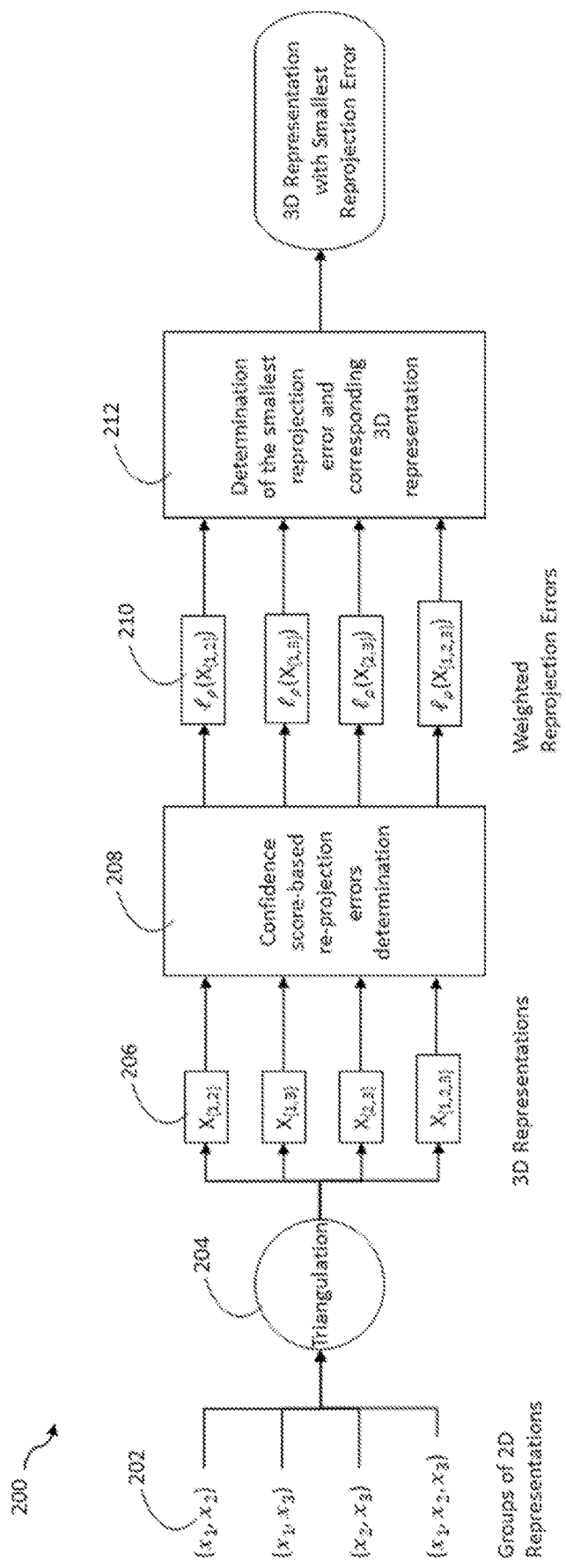
FIG. 2 is a simplified block diagram illustrating an example of determining a 3D representation of a keypoint based on a re-projection error.

FIG. 2 illustrates an example process 200 associated with determining a 3D representation of a keypoint. The process 200 may start with arranging existing 2D representations of the keypoint into multiple groups 202 (referred to herein as C). Each individual group among groups 202 (referred to herein as c, c∈C) may include two or more of the 2D representations (e.g., corresponding to two or more image sensors), and groups 202 (C) may include an enumeration of different (e.g., all) combinations of the existing 2D representations (e.g., groups 202 may be established based on different combinations of the image sensors). Using the example setup in FIG. 1 as an example, based on a set of three image sensors (e.g., S={1, 2, 3}), four groups may be established for the image sensors or the 2D representations generated based on the image sensors (e.g., C={{1, 2}, {1, 3}, {2, 3}, {1, 2, 3}}). For each individual group of groups 202, a triangulation 204 (e.g., such as the triangulation 114 in FIG. 1) may be performed based on the 2D representations included in the group so as to derive a candidate 3D representation 206 for the group. For instance, for group {$x_1$, $x_2$}, the 2D representations $x_1$ and $x_2$ may be triangulated into a 3D representation $X_{\{1,2\}}$. Using similar techniques, the 2D representations of the other groups 202 may be triangulated into 3D representations $X_{\{1,3\}}$, $X_{\{2,3\}}$, $X_{\{1,2,3\}}$ for groups {$x_1$, $x_3$}, {$x_2$, $x_3$}, and {$x_1$, $x_2$, $x_3$}, respectively.

In examples, for each 3D representation 206, a weighted re-projection error 210 (referred to herein as $\ell_\rho(X_c)$, where c∈C) may be calculated at 208, the details of which may be described further below. After the weighted re-projection errors 210 are calculated, the errors may be compared to determine the smallest weighted re-projection error and its corresponding 3D representation. Such a 3D representation (e.g., with the smallest weighted re-projection error) may be denoted as X*, where $$X^* = \arg\min_{X_c} \ell_\rho(X_c),$$

c∈C, and the 3D representation may be used to represent the keypoint, subject to other refinement operations (e.g., the temporal consistency based refinement described herein).

Figure 3:
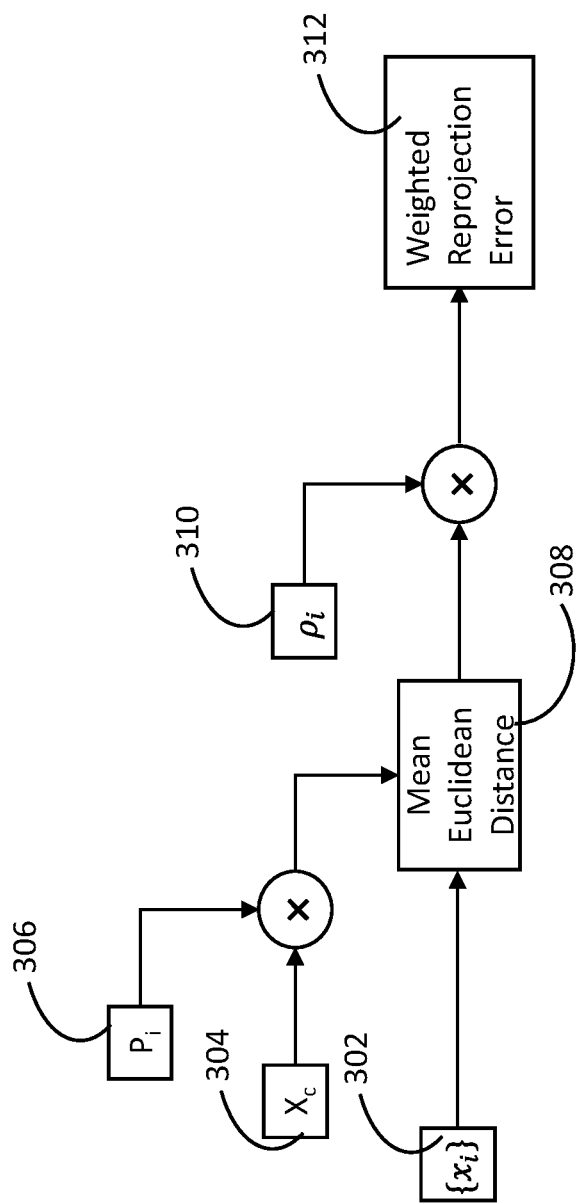
FIG. 3 is a simplified block diagram illustrating an example of calculating a weighted re-projection error for a given 3D representation.

FIG. 3 illustrates an example technique for calculating a weighted re-projection error of a given 3D representation 304 (referred to herein as $X_c$). The 3D representation 304 may be determined based on a group of 2D representations 302 (referred to herein as $\{x_i\}_{i\in c}$, where c∈C). As described herein, the group of 2D representations (e.g., such as the group of 2D representations 202 in FIG. 2) may be estimated based on a set of 2D images (e.g., such as 2D images 106 in FIG. 1) captured by two or more image sensors, and the 3D representation 304 ($X_c$) may be calculated by triangulating the group of 2D representations 302 ($\{x_i\}_{i\in c}$). For instance, if c={1,2}, then the group of 2D representations 302 may be denoted as {$x_1$, $x_2$}, and the 3D representation 304 may be denoted as $X_{\{1,2\}}$.

The accuracy of the 3D representation 304 may be determined or indicated by a re-projection error. In examples, such a re-projection error may be calculated based on the projection matrix 306 (referred to herein as P) of an image sensor, the coordinate system of which may be used for the re-projection. The projection matrix 306 may be defined by the intrinsic and/or extrinsic parameters of the image sensor, which may be known to the system (e.g., system 100 in FIG. 1) or apparatus (e.g., apparatus 150 in FIG. 1) described herein. Thus, a 2D re-projection of the 3D representation X in the coordinate system of the image sensor may be calculated using the projection matrix 306 of the image sensor, for example, based on the following: $\tilde{x}_i = X_c P_i$, where $X_c$ may represent the 3D representation associated with a group c, $\tilde{x}_i$ may represent the 2D re-projection of $X_c$ in the coordinate system of image sensor i in group c (i∈c), and $P_i$ may represent the projection matrix 306 of the image sensor i.

Once the re-projection of the 3D representation into the 2D coordination system of image sensor i is determined, a re-projection error (referred to herein as $\ell(X_c)$) of the 3D representation $X_c$ may be calculated at 308, for example, based on a mean Euclidean distance between the 2D re-projections ($\tilde{x}_i$, as described above, where i∈c) and the original 2D representations ($x_i$, where i∈c). This operation may be illustrated by Equation 1) below:

$$\ell(X_c) = \frac{1}{\mathrm{card}\ c}\sum_{i\in c}|x_i - X_c P_i|^2 \qquad 1)$$

Then, a confidence score 310 ($\rho_i$, such as the confidence score 112 in FIG. 1) representing an accuracy of the 2D representation 302 ($x_i$) may be used to weight the re-projection error determined using Equation 1). For instance, utilizing the confidence score 310 as an input, a weighted re-projection error 312, denoted as $\ell_p(X_c)$ (e.g., such as the weighted re-projection error 210 in FIG. 2), may be calculated based on Equation 2) below:

$$\ell_p(X_c) = \frac{1}{\text{card } c} \sum_{i \in c} \rho_i |x_i - X_c P_i|^2, \qquad 2)$$

and a candidate 3D representation from a group (e.g., one of groups $\{x_1, x_2\}$, $\{x_1, x_3\}$, $\{x_2, x_3\}$, and $\{x_1, x_2, x_3\}$ in FIG. 2) that has the smallest sum of weighted re-projection errors may be selected to represent a keypoint in the 3D space, as described herein.

Figure 4:
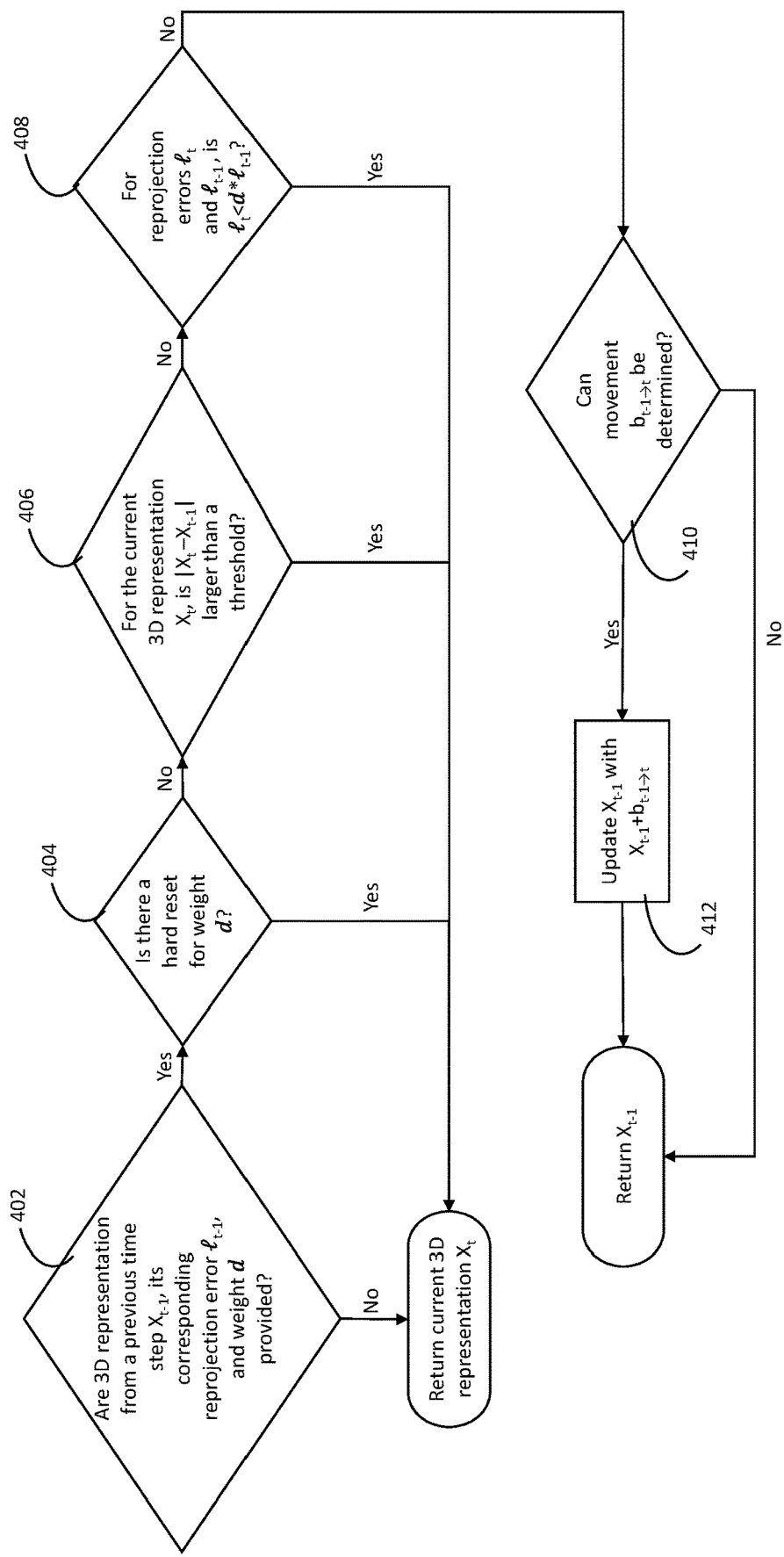
FIG. 4 is a flow diagram illustrating an example of ensuring temporal consistency between multiple 3D representations.

FIG. 4 is a flow diagram illustrating example operations that may be associated with refining a 3D representation of a keypoint based on other 3D representations of the keypoint determined using images captured at different time steps. As shown, a first 3D representation being refined may be generated based on images captured at a first time (referred to herein as t) and may be denoted as ($X_t$). A second 3D representation used to refine the first 3D representation may be generated based on images captured at a second time (referred to herein as t−1, which may be earlier than t) and may be denoted as ($X_{t-1}$).

At 402, a determination may be made regarding whether information associated with the previous time step (t−1) is provided. Such information may include, for example, a 3D representation from the previous time step $X_{t-1}$, its corresponding re-projection error (e.g., such as the weighted re-projection error 210 in FIG. 2, which may be referred to herein as $\ell_{t-1}$), and/or a weight d (also referred to as a decay weight or decay coefficient) that may reflect the timespan between t and t−1 or a difference between two 3D representations respectively associated with t and t−1. If the determination at 402 is that the information associated with t−1 is not provided, the refinement operations may end and the 3D representation associated with time t may be returned. If the determination at 402 is that the information associated with t−1 is provided, a further determination regarding the weight (d) to be applied may be made at 404. For instance, if the determination at 402 is that the information associated with the previous time step ($X_{t-1}$, $\ell_{t-1}$, d) is provided, the determination at 404 may be related to whether a hard reset is to be applied for the weight d. If there is a hard reset for the weight d, e.g., d<0, the refinement operations may end and the 3D representation associated with the current time step ($X_t$) may be returned. A hard reset for the weight d may be applied, for example, if it is determined that the person whose 3D posed is being reconstructed has moved since the previous time step. In these situations, the weight d may be set to zero or a negative value so that the refinement operations may discard $X_{t-1}$ and return $X_t$.

If the determination at 404 is that no hard reset is to be applied to weight d, another determination may be made at 406 regarding a difference or distance (e.g., in terms of a time difference between t−1 and t or a difference between $X_{t-1}$ and $X_t$) between 3D representation $X_{t-1}$ and 3D representation $X_t$. If the distance between $X_{t-1}$ and $X_t$ is greater than a threshold value, e.g., $|X_t - X_{t-1}|$ or $|t-(t-1)|$ is greater than the threshold value, the refinement operations may end and $X_t$ may be returned. If the determination at 406 is that the distance between $X_{t-1}$ and $X_t$ is not greater than the threshold value, another determination may be made at 408 regarding a re-projection error $\ell_t$ associated with time t and a re-projection error $\ell_{t-1}$ associated with time t−1. If re-projection error $\ell_t$ is smaller than re-projection error $\ell_{t-1}$ weighted by d, e.g., $\ell_t < d * \ell_{t-1}$, the refinement operations may end and $X_t$ may be returned. Otherwise, the operations may proceed to 410. Weighting the re-projection error $\ell_{t-1}$ by weight d may compensate for the likelihood that the person has moved during the timespan between t and t−1. For example, the longer the timespan between t and t−1 is, the more likely the person has moved and thus the less likely $X_{t-1}$ may be used to refine $X_t$ or represent the keypoint in the 3D space.

If the determination at 408 is that the re-projection error $\ell_t$ is not smaller than the re-projection error $\ell_{t-1}$ weighted by d, another determination may be made at 410 regarding the whether the movement of the person (e.g., due to adjustment of a surgery table) between t and t−1 may be determined. If the person has moved between t and t−1, but the movement cannot be determined (e.g., not provided), the refinement operations may end and $X_{t-1}$ may be returned. Otherwise, the movement of the person may be determined (e.g., referred to herein as $b_{t-1 \to t}$) and the 3D representation $X_{t-1}$ may be updated based on the movement (e.g., as $X_{t-1} + b_{t-1 \to t}$), before the refinement operations may end and the updated $X_{t-1}$ may be returned. For example, if a surgery table that the person is lying on was moved from one predefined position to another position, then the 3D prediction $X_{t-1}$ may be transformed according to the movement before being returned to account for the movement.

For simplicity of explanation, the operations associated with refining a 3D representation may be depicted in FIG. 4 and/or described with a specific order. It should be appreciated, however, that these operations may occur in various orders, concurrently, and/or with other operations not presented or described herein. Furthermore, it should be noted that not all operations that the example apparatus is capable of performing are depicted in FIG. 4 and described herein. It should also be noted that not all illustrated operations may be required to be performed by the example apparatus.

The systems, methods, and/or instrumentalities described herein may be implemented using one or more processors, one or more storage devices, and/or other suitable accessory devices such as display devices, communication devices, input/output devices, etc. FIG. 5 is a block diagram illustrating an example apparatus 500 that may be configured to perform the 3D pose estimation tasks described herein. As shown, apparatus 500 may include a processor (e.g., one or more processors) 502, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 500 may further include a communication circuit 504, a memory 506, a mass storage device 508, an input device 510, and/or a communication link 512 (e.g., a communication bus) over which the one or more components shown in the figure may exchange information.

Communication circuit 504 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 606 may include a storage medium (e.g., a non-transitory storage medium) configured to store machine-readable instructions that, when executed, cause processor 502 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 508 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 502. Input device 510 may include a keyboard, a mouse, a voice-controlled input device, a touch sensitive input device (e.g., a touch screen), and/or the like for receiving user inputs to apparatus 500.

It should be noted that apparatus 500 may operate as a standalone device or may be connected (e.g., networked, or clustered) with other computation devices to perform the functions described herein. And even though only one instance of each component is shown in FIG. 6, a skilled person in the art will understand that apparatus 500 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
one or more processors configured to:
obtain a first set of images of a person, wherein each of the first set of images is captured by a respective image sensor;
determine respective two-dimensional (2D) representations of a keypoint of the person based on the first set of images, wherein each 2D representation is associated with a confidence score;
determine a first three-dimensional (3D) representation of the keypoint based on the 2D representations of the keypoint and the confidence score associated with each 2D representation, wherein, during the determination of the first 3D representation of the keypoint, the one or more processors are configured at least to:
arrange the 2D representations of the keypoint into multiple groups, wherein each group includes two or more of the 2D representations;
predict, for each of the multiple groups, a respective candidate 3D representation of the keypoint by triangulating the two or more 2D representations of the keypoint included in the group;
calculate a respective prediction error associated with the prediction of the candidate 3D representation for each of the multiple groups, wherein the calculation is made at least by obtaining 2D re-projections of the candidate 3D representation in respective coordinate systems associated with the two or more 2D representations of the group and calculating a sum of differences between the 2D re-projections and the two or more 2D representations; and
select the candidate 3D representation with the smallest calculated prediction error as the first 3D representation of the keypoint; and
estimate a 3D pose of the person based on at least the first 3D representation of the keypoint.

2. The apparatus of claim 1, wherein the sum of differences is calculated by determining a respective difference between each of the 2D re-projections and a corresponding 2D representation among the two or more 2D representations, weighting the difference by the confidence score associated with the corresponding 2D representation, and calculating a total of the weighted differences.

3. The apparatus of claim 1, wherein the confidence score associated with each of the 2D representations indicates an accuracy of the 2D representation.

4. The apparatus of claim 1, wherein the keypoint of the person corresponds to a joint location of the person.

5. The apparatus of claim 1, wherein the one or more processors are further configured to obtain a second 3D representation of the keypoint of the person based on a second set of images of the person, the second set of images being captured earlier than the first set of images, and wherein the one or more processors are further configured to refine the first 3D representation of the keypoint with the second 3D representation of the keypoint.

6. The apparatus of claim 5, wherein the one or more processors are further configured to determine a time span between when the second set of images was captured and when the first set of images was captured, the one or more processors further configured to refine the first 3D representation of the keypoint with the second 3D representation of the keypoint based on the time span.

7. The apparatus of claim 6, wherein the one or more processors being configured to refine the first 3D representation with the second 3D representation based on the time span comprises the one or more processors being configured to apply a weight to the second 3D representation during the refinement of the first 3D representation, the weight being inversely proportional to the time span.

8. The apparatus of claim 7, wherein the one or more processors are configured to set the weight to zero if the time span exceeds a threshold value.

9. The apparatus of claim 7, wherein the one or more processors are configured to set the weight to zero if a difference between the first 3D representation and the second 3D representation exceeds a threshold value.

10. The apparatus of claim 5, wherein the one or more processors being configured to refine the first 3D representation of the keypoint with the second 3D representation of the keypoint comprises the one or more processors being configured to adjust the second 3D representation of the keypoint based on a movement of the person between when the second set of images was captured and when the first set of images was captured.

11. A method of estimating three-dimensional (3D) human poses, the method comprising:
- obtaining a first set of images of a person, wherein each of the first set of images is captured by a respective image sensor;
- determining respective two-dimensional (2D) representations of a keypoint of the person based on the first set of images, wherein each 2D representation is associated with a confidence score;
- determining a first 3D representation of the keypoint based on the 2D representations of the keypoint and the confidence score associated with each 2D representation, wherein the first 3D representation is determined at least by:
  - arranging the 2D representations of the keypoint into multiple groups, wherein each group includes two or more of the 2D representations;
  - predicting, for each of the multiple groups, a respective candidate 3D representation of the keypoint by triangulating the two or more 2D representations of the keypoint included in the group;
  - calculating a respective prediction error associated with the prediction of the candidate 3D representation for each of the multiple groups, wherein the calculation is made at least by obtaining 2D re-projections of the candidate 3D representation in respective coordinate systems of the two or more 2D representations of the group and calculating a sum of differences between the 2D re-projections and the two or more 2D representations;
  - selecting the candidate 3D representation with the smallest calculated prediction error as the first 3D representation of the keypoint; and
- estimating a 3D pose of the person based on at least the first 3D representation of the keypoint.

12. The method of claim 11, wherein the sum of differences is calculated by determining a respective difference between each of the 2D re-projections and a corresponding 2D representation among the two or more 2D representations, weighting the difference by the confidence score associated with the corresponding 2D representation, and calculating a total of the weighted differences.

13. The method of claim 11, wherein the confidence score associated with each of the 2D representations indicates an accuracy of the 2D representation.

14. The method of claim 11, further comprising obtaining a second 3D representation of the keypoint of the person based on a second set of images of the person, and refining the first 3D representation of the keypoint with the second 3D representation of the keypoint, wherein the second set of images is captured earlier than the first set of images.

15. The method of claim 14, wherein refining the first 3D representation of the keypoint with the second 3D representation of the keypoint comprises:
- determining a time span between when the second set of images was captured and when the first set of images was captured; and
- applying a weight to the second 3D representation during the refinement of the first 3D representation, wherein the weight is inversely proportional to the time span.

16. The method of claim 14, wherein refining the first 3D representation of the keypoint with the second 3D representation of the keypoint comprises adjusting the second 3D representation of the keypoint based on a movement of the person between when the second set of images was captured and when the first set of images was captured.

* * * * *